United States Patent
Shade et al.

(10) Patent No.: US 6,519,573 B1
(45) Date of Patent: Feb. 11, 2003

(54) SYSTEM AND METHOD FOR CHARITABLE GIVING

(75) Inventors: Randi Shade, Austin, TX (US); Stephanie Hicks Butler, Austin, TX (US)

(73) Assignee: Gold Box, Inc., Austin, TX (US)

( * ) Notice: Subject to any disclaimer, the term of this patent is extended or adjusted under 35 U.S.C. 154(b) by 0 days.

(21) Appl. No.: 09/592,516

(22) Filed: Jun. 12, 2000

(51) Int. Cl.[7] ............................................... G06F 17/60
(52) U.S. Cl. ........................................................ 705/26
(58) Field of Search ..................................... 705/26, 27

(56) References Cited

U.S. PATENT DOCUMENTS

| | | | | |
|---|---|---|---|---|
| 5,826,241 A | * | 10/1998 | Stein et al. ................... | 705/26 |
| 6,317,723 B1 | | 11/2001 | Walker et al. ................. | 705/26 |
| 6,321,211 B1 | | 11/2001 | Dodd .......................... | 705/27 |

FOREIGN PATENT DOCUMENTS

| | | |
|---|---|---|
| WO | WO-01/13197 A2 * | 2/2001 |

OTHER PUBLICATIONS

GiftCertificates.com, "Sprint Announces Availability to Purchase From GiftCertificates.com by Using Wireless Phones", Jul. 24, 2000.*

GiftCertificates.com, "SuperCertificates are the Ultimate Gift for Any Occasion".*

"Still Need to Send Holiday Greetings?", PR Newswire, Dec. 22, 1999, p. 440.*

Potter, Debra, "Websites that help you be an informed giver", Medical Economics, Sep. 22, 1997, vol. 74, No. 19, pp. 17–18.*

* cited by examiner

*Primary Examiner*—Robert P. Olszewski
*Assistant Examiner*—Bryan Jaketic
(74) *Attorney, Agent, or Firm*—Vinson & Elkins L.L.P.

(57) ABSTRACT

The mention relates to a new method and system for enabling three-party charitable gift giving. A host operates a central server, such as a web site, and potentially other support services, such as telephonic support. A gift giver visits the host web site and selects a donation amount and a gift recipient. The host then transmits the charitable gift to the gift recipient, along with a unique code which enables the gift recipient to redeem the charitable gift. The gift recipient then visits the host web site, selects a charity from a list of available options, and the gift is sent to the selected donee charity by the host.

16 Claims, 2 Drawing Sheets

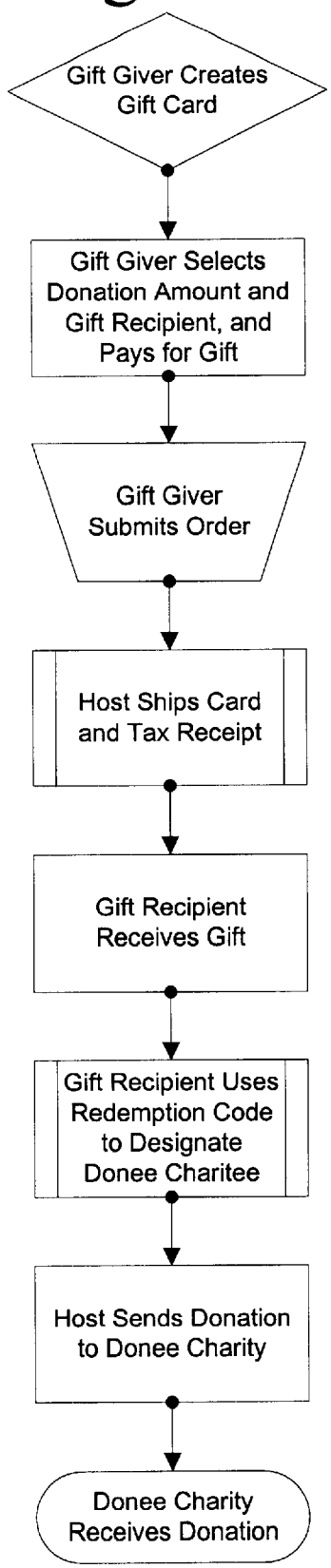

US 6,519,573 B1

SYSTEM AND METHOD FOR CHARITABLE GIVING

FIELD OF THE INVENTION

The invention relates generally to the field of charitable giving, and more particularly to a method and system for a party to enable charitable giving by another.

RELATED ART

Charitable giving has long been lauded as a desirable social objective. Prior art charitable giving systems have typically included two parties—the donor, and the donee charity. This approach remains the primary model in which charitable giving occurs, but new methods of facilitating charitable giving are desirable.

The ability to convey the resources to make a charitable donation to another party has heretofore been nonexistent, or at the least cumbersome. A common prior art system enables an individual or organization to make a charitable donation to a specific donee charity in the name of another person or organization. This prior art system suffers, however, from the inability of the person in whose name the charity donation is being made from actually selecting the charitable donation.

It has therefore become desirable to develop a new method and system for enabling charitable donations by a gift recipient, as accomplished by the present invention.

BRIEF DESCRIPTION OF THE DRAWINGS

The present invention is illustrated by way of example and not limitation in the accompanying figures, in which like references indicate similar elements, and in which:

FIG. 2 is a flowchart showing a preferred embodiment of the methodology of multi-party charitable gift giving of the present invention.

DESCRIPTION OF THE PREFERRED EMBODIMENT

Figure 1:
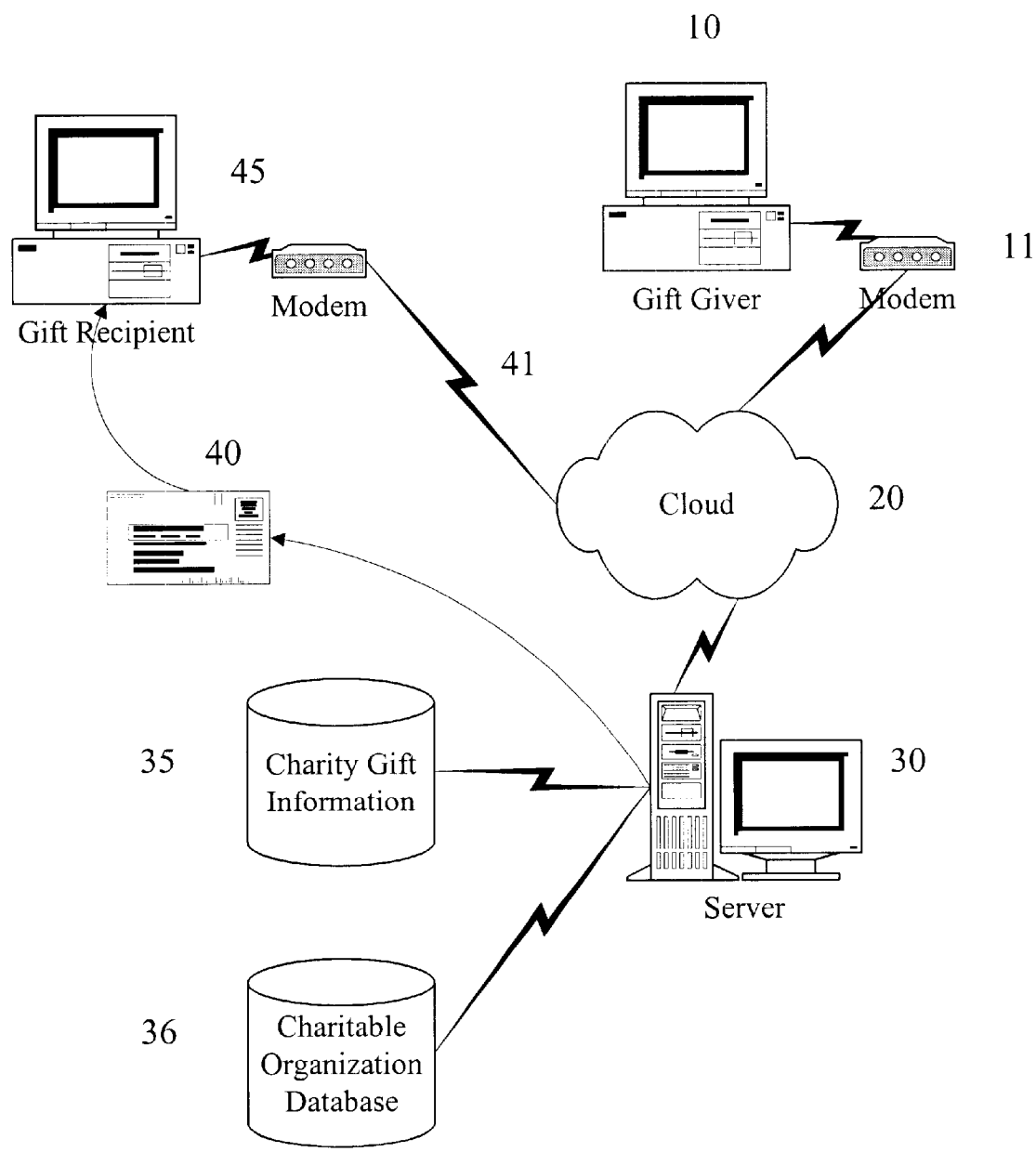
FIG. 1 is a diagram showing a base computer system and network for carrying out a preferred embodiment of the present invention.

The following discussion is intended to provide a detailed description of at least one embodiment of the invention and should not be taken to be limiting of the invention itself. Rather, any number of variations may fall within the scope of the invention which is properly defined in the claims following this description.

The system and method of the present invention contemplates the involvement of four parties, including the system provider. It provides a mechanism and infrastructure for a third party (the gift recipient) to designate a charity which will benefit from a transaction between parties one (the host) and two (the gift giver). As used herein, the following terms will be ascribed the following meanings:

(1) "Host" shall mean the system, company or individual, or combination thereof, which hosts the base web site and/or telephone system as described in greater detail herein.

(2) "Gift giver" shall mean the person, company or organization, or combination thereof, which purchases the charity gift from the host and selects a gift recipient, who is able to designate a donee charity for receipt of the charitable gift funds.

(3) "Gift recipient" shall mean the person, company or organization, or combination thereof, which receives the charity gift from the Gift giver, and who is able to designate a donee charity for receipt of the charitable gift funds.

(4) "Donee charity" shall mean the company or organization, or combinations thereof, which finally receives the charitable gift funds. A donee charity will typically be a non-profit organization and enjoy tax-exempt status.

Generally, a preferred embodiment of system incorporating the present invention is comprised of the following four integrated systems, which are explained in greater detail below:

1. a Public Web Site;
2. the Gift Fulfillment Application;
3. a Customer Service System (e.g., Call Center Operations); and
4. the Charity Payment Process These are described in greater detail below, though they are not necessarily required for the system and method of the present invention.

Public Web Site

The public web site is the primary interface between the host and its respective groups. Referring to FIG. 1, the public web site resides on server 30, which is in communication with storage device 35 for storing charity gift information and database 36 for storing information regarding charitable organizations.

The public web site (not shown) allows the gift giver 10 and other customers to search for and learn about charities, place orders, obtain tracking information and account donation information and redeem gifts. The public web site also serves as the mechanism for charities to update their information in charitable organization database 36, track charitable gift information 35, and serve as a payment processing mechanism for donations made to their organization. The public web site also serves as a tracking tool and reporting system for affinity partners [explain]. Visitors may also search the charitable organization database 36 and view detailed information about charities which have created accounts with host.

Gift Fulfillment Application

The Gift Fulfillment Application serves as the backend tool for creating, tracking and ensuring charity gifts and gift cards are delivered to their desired destination, such as the designated gift recipient 45. The application includes payment authorization, creation of a gift card 40 (print, e-mail or other format), and tracking and quality control of an order and ability to reprocess orders if required.

Customer Service System

The Customer Service System, including call center operations, allows host representatives to handle customer service issues and perform maintenance Items for the public web site. The Customer Service System is used primarily by customer service representatives handling phone and email correspondence with customers (including gift givers and gift recipients), charities and the general public. The Customer Service System is also used to manually update content on the public site, expire unredeemed gifts, deliver tax receipts for year end tax reporting, and other database functionality.

Charity Payment Process

The Charity Payment Process involves the distribution of funds to donee charities selected by gift recipients (e.g., 45). The charity is selected, either by the gift recipient or by default from the gift giver. The process concludes when the funds are received and accounted for by the donee charity.

Other details of a core system for implementing the present invention are shown in FIG. 1. As can be seen, gift giver 10 accesses server 30 via a personal computer having a modem 11 or other communication means, such as through a network, wireless communication means, or the like. Server responds to gift giver queries for information. If gift giver 10 purchases a gift, server 30 requests information (as with the Gift Fulfillment Application) for storage in charity gift information storage device 35.

In a preferred embodiment, server 30 then automatically generates a gift card 40, which may be electronic or print, and gift card 40 is sent to gift recipient: 40. In an alternative embodiment, server 30 may alert representatives of the host, and those representatives may manually generate and send gift card 40. Upon receipt of gift card 40, gift recipient 45 may access server 30 to redeem the gift represented by gift card 40, typically by using a unique code associated with the particular gift.

A preferred embodiment of the methodology of the present invention is further illustrated in FIG. 2. As shown in step 50, the gift giver 10 may create a gift card 40 for conveying the gift to gift recipient 45. The gift giver 10 can choose from a printed card, an e-card, a card they can print on his or her own printer, or no card at all. Moreover, the gift giver 10 may select the gift card 40 from a group of preexisting types, or may be custom-generated by gift giver 10. In addition, the gift giver 10 may add a personal message.

Next, gift giver 10 provides gift-related information (60). For instance, gift giver 10 selects an amount for the donation. In addition, the gift giver 10 specifies the gift recipient 45, address and delivery information. The gift giver 10 may also provide other information to host, such as specific charities or categories of charities that must or may not be selected as the donee charity. The gift giver chooses whether or not the amount of the donation is displayed on the gift card 40. To ensure all charitable donations go to charity, the gift giver 10 is asked to select a charity to benefit from the contribution should the gift recipient 45 not choose one.

In this way, the gift giver 10 purchases a prepaid charitable donation that is represented by a unique identifying code associated with that charitable gift. The host provides this unique charitable gift identifier, referred to herein as a "Gift Tag Number." The host typically will sell gift cards 40 upon which Gift Tag Numbers are identified, and may also sell Gift Tag Numbers without cards, so that they may be attached or applied to any item the gift giver wishes, such as flowers or a box of chocolates.

A Gift Tag Number appears on each gift and is the code the recipient uses to designate the gift. The gift giver 10 may also select the gift recipient 45. In alternative embodiments, the gift giver 10 may provide additional information. For example, the gift giver 10 may designate a group or predefined category of donee charities from which the gift recipient may choose, or designate specific charities or categories thereof which may not be selected by the gift recipient (e.g., if the gift giver is opposed to abortion rights, he or she may select the Planned Parenthood organization as a charity that the gift recipient may not select).

Still referring to step 60, payment is then made by gift giver 10. Orders will normally be paid for via credit card or transfer payment. Alternative payment methods, such as purchase order or check, may also be accommodated. Card prices may be selectively adjusted based upon the number of cards ordered, or the size of the charitable donation.

The order is then submitted (70), usually by push-button confirmation, and is shipped to the gift recipient 45. After gift giver 10 submits the order, host ships (80) the; gift card 40 to gift recipient 45. In a preferred embodiment, the card is accompanied by a tax receipt so that the gift recipient may potentially obtain a tax benefit.

The gift recipient 45 then receives the card 40 containing the identifier (90). The gift recipient 45 may redeem the gift as follows. The gift recipient enters the Gift Tag Number at the web site on server 30 (or via other communication means, such as telephonically, via email, modem, or the like), and searches among available options to find a charity for the gift. The options, which reside in charitable organizations database 36, may be centrally updated from time to time by the host. The gift recipient chooses which charity will benefit from the donation (i.e., the donee charity), and confirms the selection. The Gift Tag Number acts as a redemption code so gift recipient 45 may select the donee charity of his or her choice, potentially subject to constraints imposed by the gift giver 10.

Finally, the donee charity is transmitted the charity donation. As shown in steps 110 and 120, the host then sends and the donee charity receives the funds donated, preferably on a periodic basis, and multiple charity gifts are collected for disbursement. In a preferred embodiment, the host allocates funds to all or most donee charities chosen by various gift givers and their gift recipients on a monthly basis. The host may further provide a report listing each funding allocation. The host keeps confidential the names of gift recipients and donors associated with each donation, unless provided express permission to release such information to the chosen charities.

The foregoing discussion is included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

What is claimed is:

1. A method of facilitating charitable gift giving, comprising:

establishing a web site, comprising a database with a list of charitable organizations that may be selected by a gift recipient;

requesting charitable gift information from a gift giver, said charitable gift information comprising a donation amount and a gift recipient;

generating a unique code associated with a charitable gift to which said charitable gift information pertains, said unique code for enabling a gift recipient to select a donee charity;

transmitting to said gift recipient said unique code;

presenting said gift recipient with a group of acceptable donee charities;

requesting input of said unique code, and selection of said donee charity from said group of acceptable donee charities;

transmitting to said donee charity funds corresponding to said donation amount;

transmitting to said gift recipient a gift card; and transmitting to said gift giver a tax receipt.

2. The method of facilitating charitable gift giving of claim 1, wherein said group of acceptable donee charities excludes a specific charitable organization designated by said gift giver.

3. The method of facilitating charitable gift giving of claim 1, wherein said group of acceptable donee charities excludes a category of charitable organizations designated by said gift giver.

4. The method of facilitating charitable gift giving of claim 1, wherein said group of acceptable donee charities is limited to a plurality of charitable organizations designated by said gift giver.

5. The method of facilitating charitable gift giving of claim 1, wherein said group of acceptable donee charities is limited to a category of charitable organizations designated by said gift giver.

6. A computerized system for facilitating charitable gift giving comprising:
- a server hosting an interactive website, said server is configured to accept information from a gift buyer relating to said charitable gift, to accept payment for said charitable gift by a gift buyer, to generate a unique code associated with a charitable gift, and to allow selection of a donee charity by a gift recipient using said unique code, and wherein said server is configured to generate a tax receipt along for transmission to said gift giver;
- storage for a charitable organization database in communication with said server, said charitable organization database accessible at least in part by said gift recipient; and
- storage for a charitable gift database in communication with said server, said charitable gift database containing information regarding said charitable gift.

7. The system for facilitating charitable gift giving of claim 6, wherein said selection of said donee charity is from a group defined by said gift giver.

8. The system for facilitating charitable gift giving of claim 7, wherein said group excludes a specific charitable organization designated by said gift giver.

9. The system for facilitating charitable gift giving of claim 7, wherein said group excludes a category of charitable organizations designated by said gift giver.

10. The system for facilitating charitable gift giving of claim 7, wherein said group is limited to a plurality of charitable organizations designated by said gift giver.

11. The system for facilitating charitable gift giving of claim 7, wherein said group is limited to a category of charitable organizations designated by said gift giver.

12. A method of conducting business for charitable gift giving comprising:
- obtaining information from a gift buyer relating to a charitable gift;
- obtaining payment information for said charitable gift from said gift buyer;
- transmitting a gift card to a gift recipient, said gift card having a unique designator associated with said charitable gift;
- upon entry of said unique designator by said gift recipient, allowing said gift recipient to select a donee charity from among a preselected group;
- transmitting funds corresponding to said charity gift to said donee charity; and transmitting to said gift giver a tax receipt along with said gift card.

13. The method of conducting business for charitable gift giving of claim 12, wherein said preselected group of charities excludes a specific charitable organization designated by said gift giver.

14. The method of facilitating charitable gift giving of claim 12, wherein said preselected group of charities excludes a category of charitable organizations designated by said gift giver.

15. The method of facilitating charitable gift giving of claim 12, wherein said preselected group of charities is limited to a plurality of charitable organizations designated by said gift giver.

16. The method of facilitating charitable gift giving of claim 12, wherein said preselected group of charities is limited to a category of charitable organizations designated by said gift giver.

* * * * *

(12) EX PARTE REEXAMINATION CERTIFICATE (6132nd)
United States Patent
Shade et al.

(10) Number: US 6,519,573 C1
(45) Certificate Issued: Feb. 26, 2008

(54) SYSTEM AND METHOD FOR CHARITABLE GIVING

(75) Inventors: Randi Shade, Austin, TX (US); Stephanie Hicks Butler, Austin, TX (US)

(73) Assignee: Kintera, Inc., San Diego, CA (US)

Reexamination Request:
No. 90/007,921, Jan. 26, 2006

Reexamination Certificate for:
Patent No.: 6,519,573
Issued: Feb. 11, 2003
Appl. No.: 09/592,516
Filed: Jun. 12, 2000

(51) Int. Cl.
*G06F 17/00* (2006.01)

(52) U.S. Cl. .................................................. 705/26
(58) Field of Classification Search .............. 75/26, 75/27; 194/216, 217, 205, 208, 209
See application file for complete search history.

(56) References Cited

U.S. PATENT DOCUMENTS 5,909,794 A    6/1999   Molbak

OTHER PUBLICATIONS

GiftCertificates.com, "Sprint Announces Availability to Purchase From GiftCertificates.com by using Wireless Phones", Jul. 24, 2000.*

* cited by examiner

*Primary Examiner*—Matthew C. Graham

(57) ABSTRACT

The mention relates to a new method and system for enabling three-party charitable gift giving. A host operates a central server, such as a web site, and potentially other support services, such as telephonic support. A gift giver visits the host web site and selects a donation amount and a gift recipient. The host then transmits the charitable gift to the gift recipient, along with a unique code which enables the gift recipient to redeem the charitable gift. The gift recipient then visits the host web site, selects a charity from a list of available options, and the gift is sent to the selected donee charity by the host.

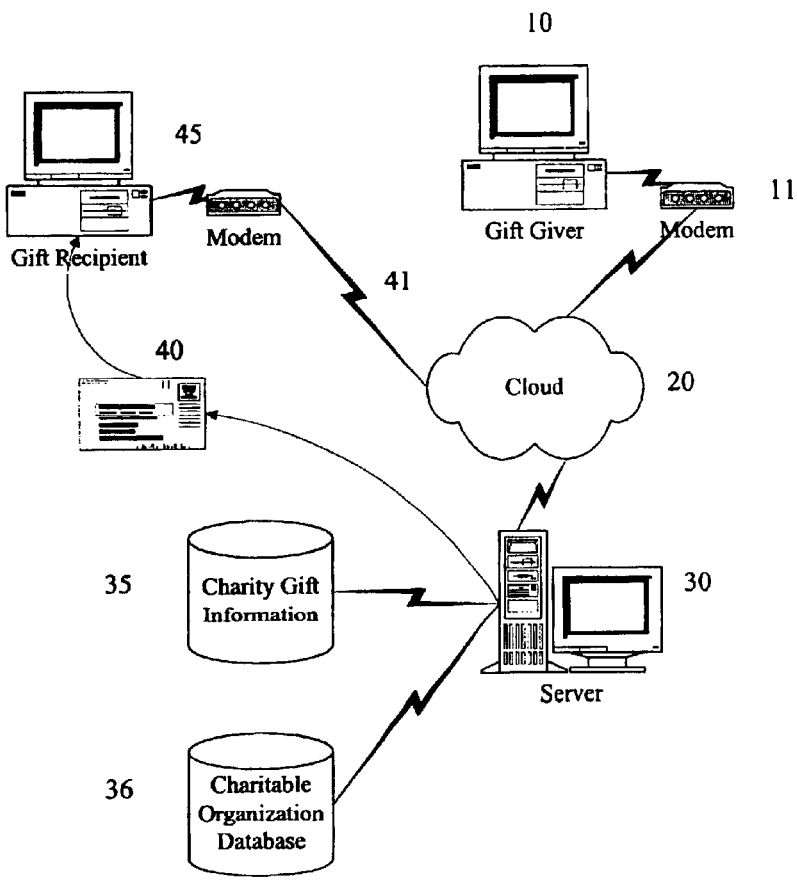

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–16 are cancelled.

* * * * *